(12) United States Patent
Thomas

(10) Patent No.: US 11,128,934 B2
(45) Date of Patent: Sep. 21, 2021

(54) RECREATIONAL VEHICLE POWER MONITOR AND REPORTING DEVICE AND METHOD

(71) Applicant: Hughes Autoformers LLC, Anaheim, CA (US)

(72) Inventor: Pat Thomas, Yorba Linda, CA (US)

(73) Assignee: Hughes Autoformers, LLC, Anaheim, CA (US)

( * ) Notice: Subject to any disclaimer, the term of this patent is extended or adjusted under 35 U.S.C. 154(b) by 0 days.

(21) Appl. No.: 16/299,144

(22) Filed: Mar. 12, 2019

(65) Prior Publication Data

US 2019/0342636 A1 Nov. 7, 2019

Related U.S. Application Data

(60) Provisional application No. 62/641,150, filed on Mar. 9, 2018.

(51) Int. Cl.
| | |
|---|---|
| *H02H 3/20* | (2006.01) |
| *H02H 3/04* | (2006.01) |
| *H04W 4/38* | (2018.01) |
| *H04Q 9/00* | (2006.01) |
| *H04B 5/00* | (2006.01) |

(52) U.S. Cl.
CPC ............. *H04Q 9/00* (2013.01); *H04B 5/0025* (2013.01); *H04Q 2209/40* (2013.01); *H04Q 2209/823* (2013.01)

(58) Field of Classification Search
None
See application file for complete search history.

(56) References Cited

U.S. PATENT DOCUMENTS

| 5,555,483 A * | 9/1996 | Pressman | H02H 3/207 340/661 |
|---|---|---|---|
| 6,087,818 A | 7/2000 | Hughes | |
| 6,965,818 B2 * | 11/2005 | Koenig | H01M 10/48 322/28 |
| 2010/0023286 A1 * | 1/2010 | Rodseth | H02H 3/046 702/65 |
| 2011/0202418 A1 * | 8/2011 | Kempton | G06Q 30/0601 705/26.1 |
| 2013/0197748 A1 * | 8/2013 | Whitaker | B60L 53/14 701/34.4 |

OTHER PUBLICATIONS

Hughes, Product User's Guide Hughes Autoformers Maintain The Power (Year: 2015).*

(Continued)

*Primary Examiner* — Curtis A Kuntz
*Assistant Examiner* — Jerold B Murphy
(74) *Attorney, Agent, or Firm* — Kevin Schraven; Anooj Patel; Hankin Patent Law, APC

(57) ABSTRACT

A power monitoring device is configured to monitor the aspects of power being supplied to an RV at an RV park. The power monitoring device communicates wirelessly to a remote device of a user to provide information about the power supplied by the park. The user can set limits of various power aspects. If aspects of the power supplied are out of compliance with the limits a notification of such may be delivered to the user's remote device.

2 Claims, 10 Drawing Sheets

(56) References Cited

OTHER PUBLICATIONS

Youtube video posted Jun. 10, 2016—Lippert Components—myRV Wireless System—The RV Doctor; https://www.youtube.com/watch?v=HvL4TT4hGkA.
Youtube video posted Sep. 4, 2015—myRV Basic Operations; https://www.youtube.com/watch?v=2gcfB9-e2iQ.
Youtube video posted Nov. 4, 2016—New "MyRV" Control Panel for Motorhomes; https://www.youtube.com/watch?v=Lssvzk-8rIQ.
Hughes Autoformers Product User's Guide, pp. 1-12.

* cited by examiner

RECREATIONAL VEHICLE POWER MONITOR AND REPORTING DEVICE AND METHOD

CROSS-REFERENCE TO RELATED APPLICATIONS

The application claims priority to U.S. Provisional Application No. 62/641,150, filed Mar. 9, 2018, the entirety of which is hereby incorporated by reference.

BACKGROUND

The present disclosure relates to the field of power monitoring and/or power conditioning devices for recreational vehicles.

Most recreational vehicles (RVs) have the capability to hook up to an external power supply ("shore power") in order to supply electrical power to the RV. RV parks typically provide such power via electrical hookups disposed at power pedestals adjacent the RV's parking space. However, RV parks are notorious for having low-quality power supplies, often providing power at exceedingly high or low voltage levels, and tending to have power spikes and surges. Such power supply problems can cause damage to electrical devices ranging from causing premature wear to the devices to overloading and causing catastrophic failure of device controls.

As such, wise RV owners will hook up their RVs to such power pedestals using power conditioning apparatus interposed between the RV's electrical system and the RV park's power pedestal. Such power conditioning apparatus can include, for example, surge protectors and/or autoformers.

However, even though RV owners can employ apparatus to protect their RVs, it can be inconvenient or impossible to check the status of power being delivered to the RV, or to know what is or has happened to such power. This is especially true when the RV user is remote from the RV.

SUMMARY

Accordingly, there is a need in the art for a device and method for monitoring and conditioning shore power as delivered to a user's RV, protecting the RV from problems with shore power, and communicating information about power delivery to the RV user in a convenient and usable manner.

In accordance with one embodiment, the present specification provides a method for monitoring and reporting power supplied to a recreational vehicle, comprising attaching a power monitor device to a park power supply, and attaching an electrical system of the recreational vehicle to an outlet of the power monitor device, the power monitoring device sensing raw power aspects; comparing the sensed raw power aspects with threshold maximum and/or minimum values; and if the sensed raw power aspect is greater than the threshold maximum value or less than the threshold minimum value, generating a notification and delivering the notification to a remote computing device via a wireless communications medium.

DESCRIPTION

Figure 1:
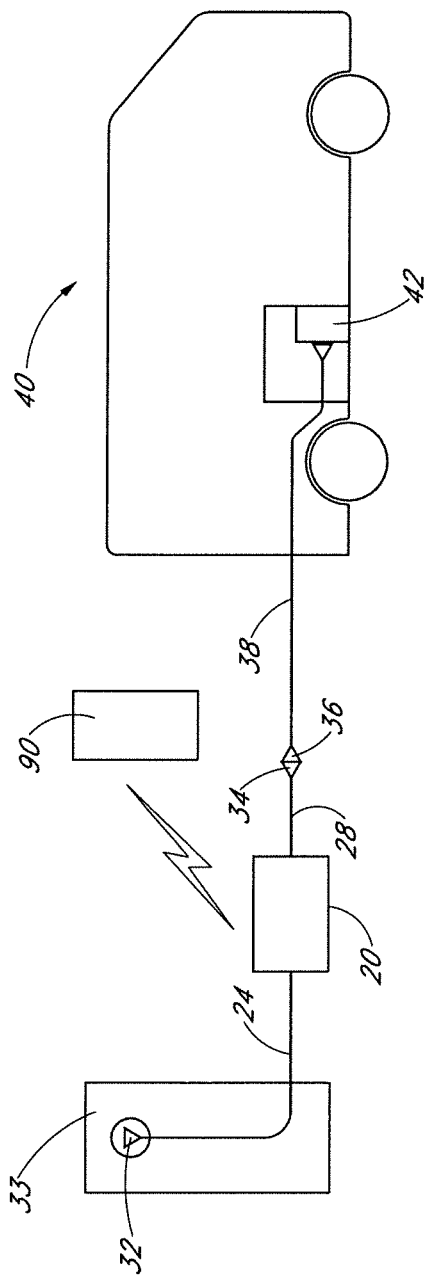
FIG. 1 is a schematic view of a power conditioner setup in accordance with one embodiment.
Figure 2:
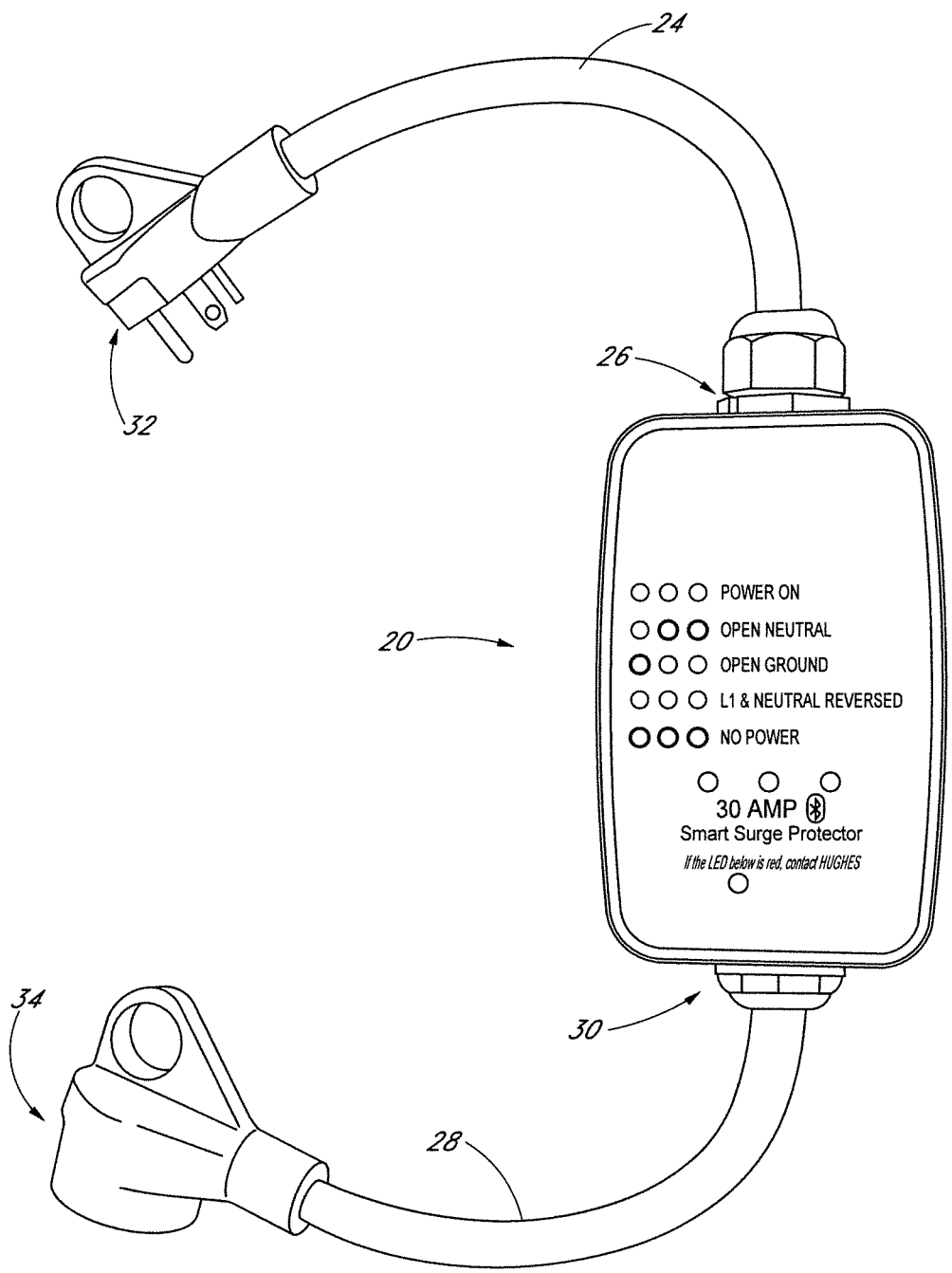
FIG. 2 shows one embodiment of a power conditioner device.

With initial reference to FIGS. 1 and 2, an embodiment of a power monitoring device 20 comprises a housing 22 connected to an input wire 24 at an input end 26 and an output wire 28 at an output end 30. The input wire 24 has an input plug 32 configured to be plugged into an RV park power supply 33 ("shore power"); the output wire 28 has an output plug 34 configured to accept a plug 36 from a power wire 38 of an RV 40. The RV power wire 38 connects to a transfer switch box 42 of the RV 40, which connects to the RV's electrical supply system. As such, the power monitoring device 20 is interposed, electrically and physically, between an RV 40 and the shore power 33.

Figure 3:
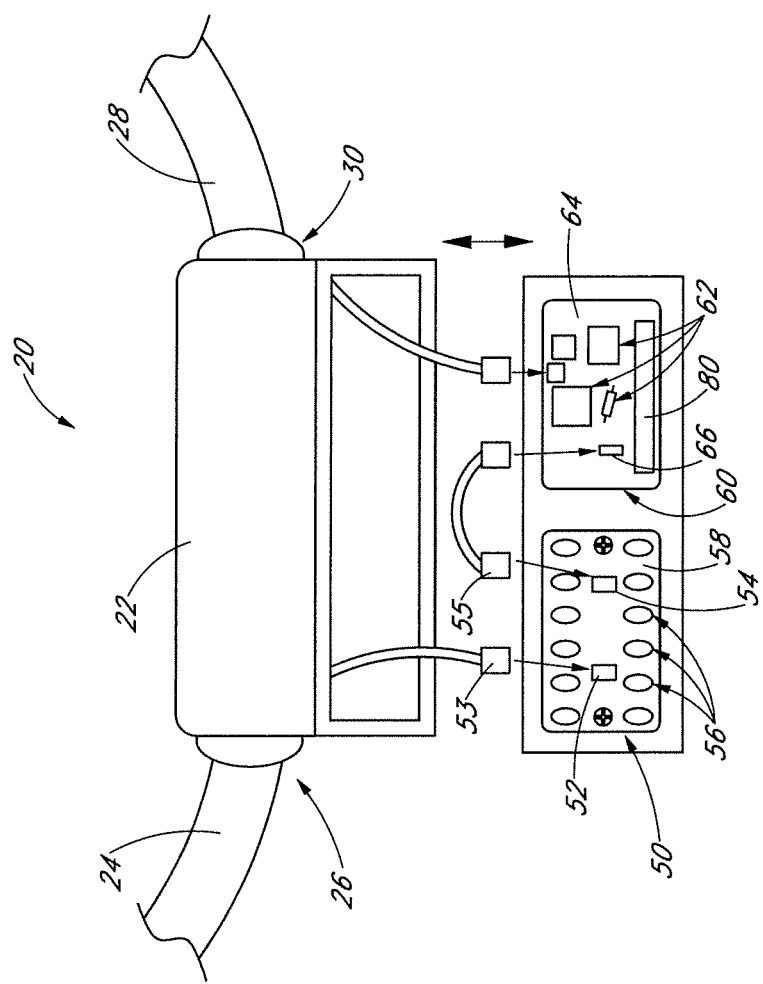
FIG. 3 shows a partially disassembled view of the power conditioner of FIG. 2.

With additional reference to FIG. 3, the housing 22 encloses a power conditioner module 50 and a power monitoring module 60, In the illustrated embodiment, the power conditioner module 50 comprises a surge protector configured to perform the power conditioning function of protecting downstream electrical devices from problems with the RV park source power, such as voltage spikes. A first connector 52 connects to input power 24 from the RV park source power, which typically is disposed on a power panel, and such input power flows through the surge protector of the power conditioner to a second, output connector 54. It is to be understood that other types of power conditioners can alternatively or additionally be included within the housing. As shown, the illustrated surge protector comprises several electronic components 56 mounted on a single printed circuit board 58.

Continuing with additional reference to FIG. 3, the power monitoring module 60 comprises several electronic components 62, such as sensors, processor(s), integrated circuits, and/or other electronic componentry mounted on a printed circuit board 64 which, in the illustrated embodiment, is a different circuit board than that upon which the surge protector 50 is mounted. An input connector 66 of the power monitoring module 60 can be releasably attached to the second connector 54 of the power conditioner 50 so that, after being conditioned, power flows to the power monitoring module 60.

The electronic components 62 of the power monitoring module 60 are configured to sense a plurality of energy parameters of the input power flowing from the RV park source power through the power monitoring device 20. Such sensing parameters can include, for example, basic parameters such as whether electricity is flowing through one or more output lines, the status of ground structures, and electricity flow parameters such as voltage, current (amps), and power delivery (watts). The electronic components 62 include processing capability that is able to perform analysis/calculations on the sensor readings and also a memory component so that measurements and/or calculations can be saved to the memory. As such, the power monitoring module 60 can sense, calculate, track and save parameters such as amps, watts, volts, energy used in a current session, total energy used over a period of time, and other parameters as desired.

Figure 4:
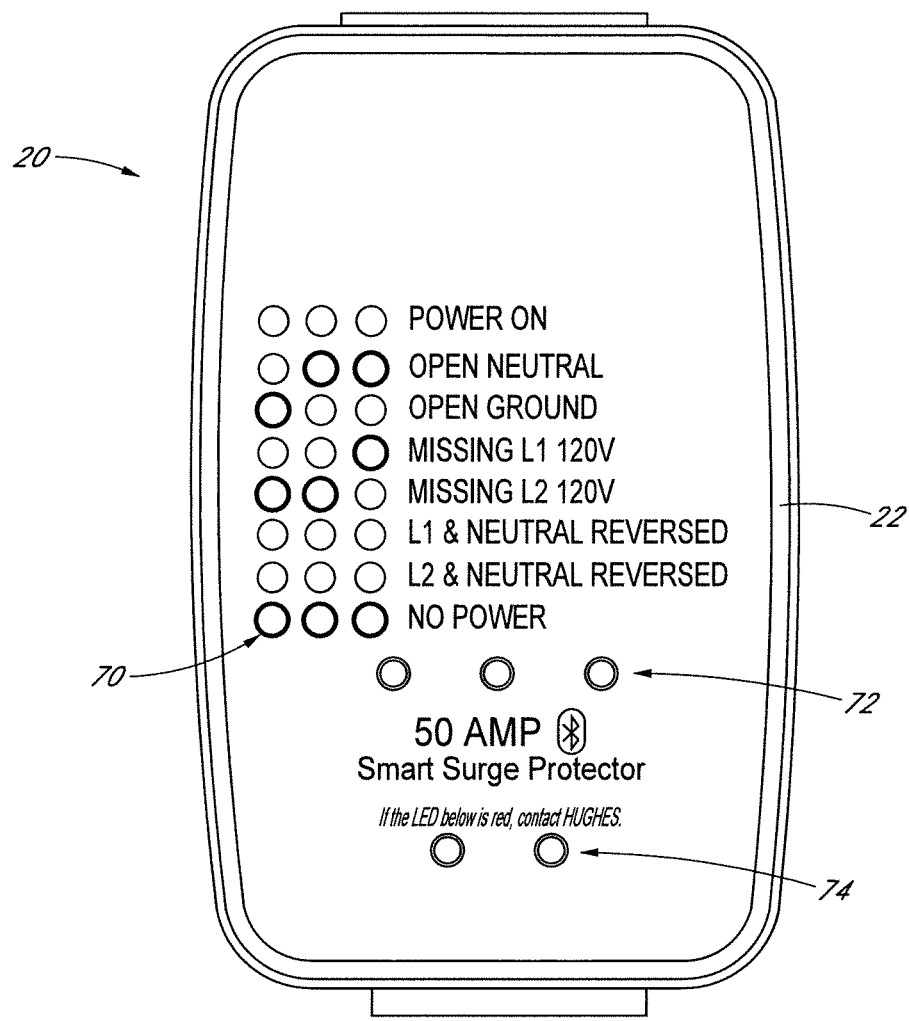
FIG. 4 shows another embodiment of a power conditioner device.

Continuing with reference to FIGS. 1-3, and with additional reference to FIG. 4, preferably a display 70 is provided on the housing 22. In the illustrated embodiments, the display is configured to provide basic information about electricity delivery, such as whether power is "on", and whether electrical connections such as neutral and ground structures are appropriately connected. Embodiments of power monitoring devices 20 can be configured for different power levels. For example, it is typical for RV parks to provide a choice between 30 Amp and 50 Amp power supply service. An embodiment employing only 30 Amp service (see FIG. 2) is less complex than that configured for 50 Amp service (see FIG. 4), as the 50 Amp embodiment will track multiple output lines.

In the illustrated embodiments, the power monitoring module 60 includes an array of three LED lamps 72—preferably RGB multicolor lamps, which are aligned to be visible through the housing at the display. The power monitoring module 60 directs the LED lamps 72 to be lit in a pattern that provides information about the condition of power delivery. Meanings of the various patterns are provided on the display adjacent the lamps 72.

In the illustrated embodiment, the power conditioner module 50 also includes one (for 30 Amp) or more (2 for a 50 Amp embodiment) LEDs 74 that are also configured so as to be visible through the housing 22 and on the display 70, adjacent a textual message concerning their meaning. In the illustrated embodiments, the power conditioner 50 is a surge protector. As is known, surge protectors can become less effective when subjected to electrical surges while protecting downstream electrical equipment. Thus, surge protectors eventually can wear out. In the illustrated embodiments, the power conditioner module 50 includes electronic circuitry that senses parameters and conditions of the surge protector electronics and can determine when the surge protector should be replaced. Upon such a determination, one or more of the surge protector LEDs 74 will be lit, signaling a user that it is time to replace the surge protector.

With particular reference to FIG. 3, preferably the power conditioner module 50 can be replaced independent of the power monitoring module 60, so as to enable replacement of a worn-out surge protector without disturbing the power monitoring module 60. Specifically, since the power conditioner module electronics 50 are mounted on a different circuit board 58 than that 64 of the power monitoring module 60, a user can access the housing 22, detach the electrical connectors 53, 55 that electrically connect the power conditioning module 50 to the power monitoring module 60 and to the power input 24, remove the entire module, and replace it with a new module. As such, if a surge protector is worn out, not only will the user be informed that it is time to replace it, but the user need not discard the entire power monitor 20 (which would include the still-functional power monitoring module), but can instead replace only the portion of the power monitor 20 that needs replacing.

Figure 5:
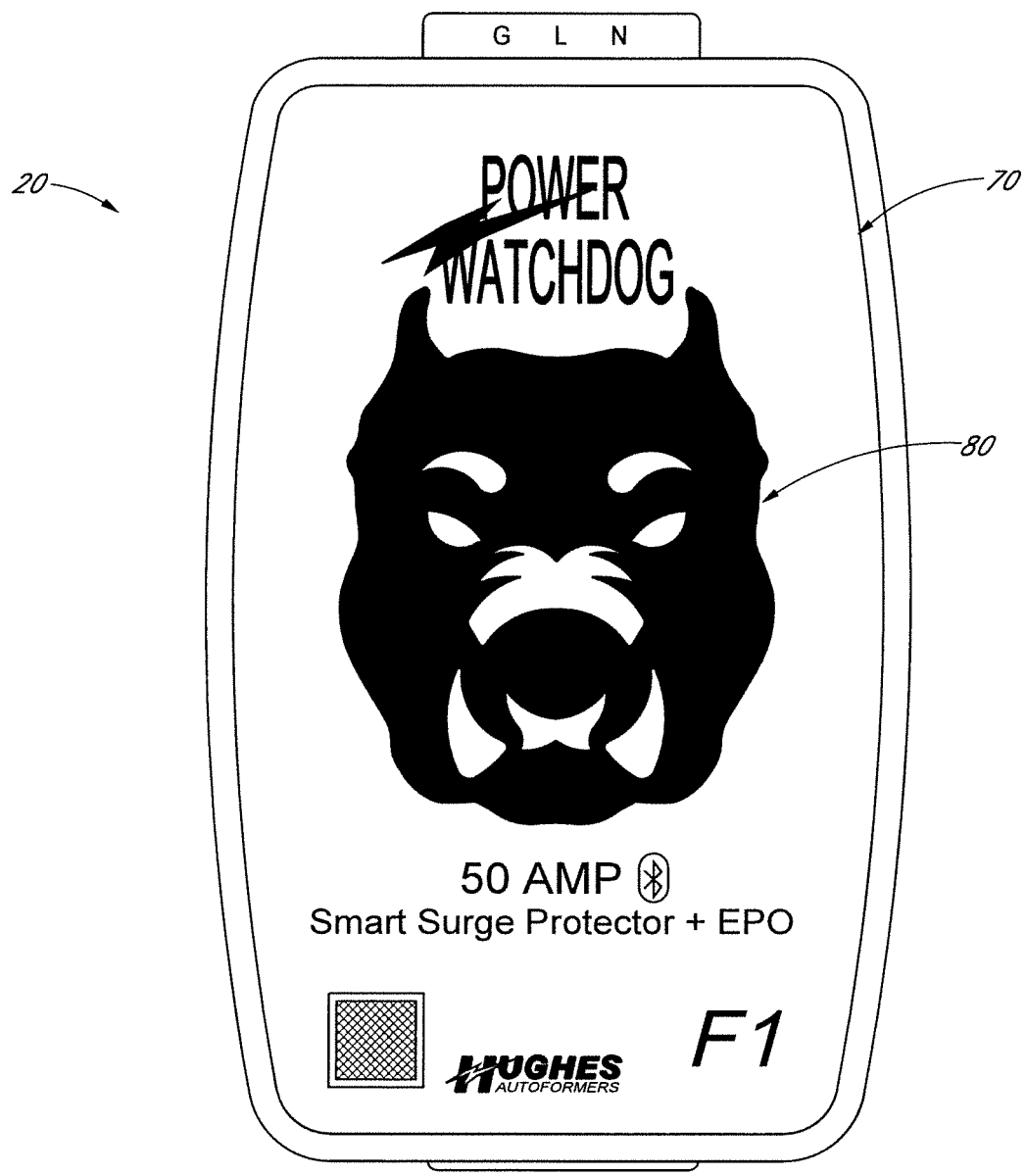
FIG. 5 shows yet another embodiment of a power conditioner device.
Figure 6:
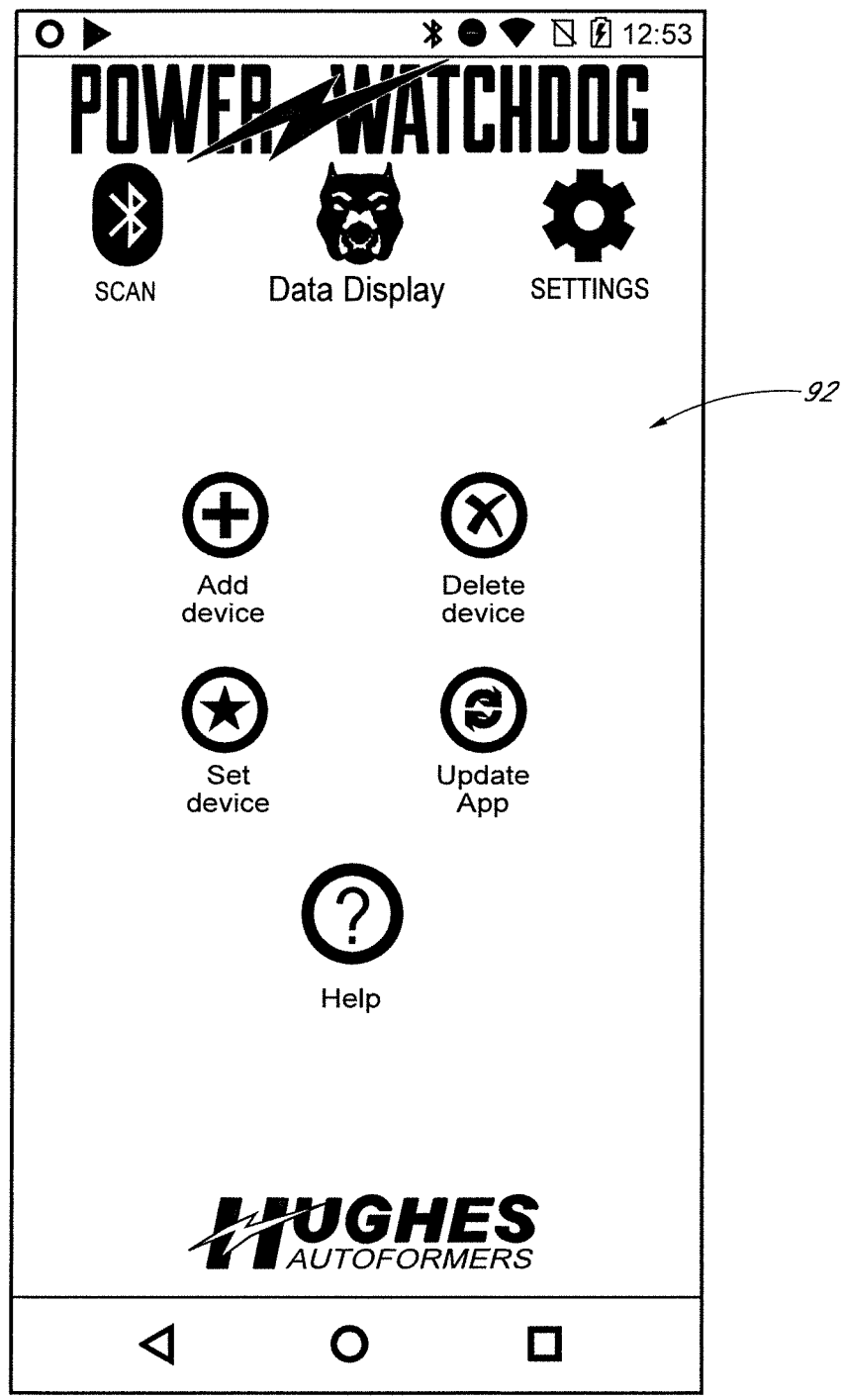
FIG. 6 shows a screen of an app for use with a remote device in communication with the power conditioner device.
Figure 7:
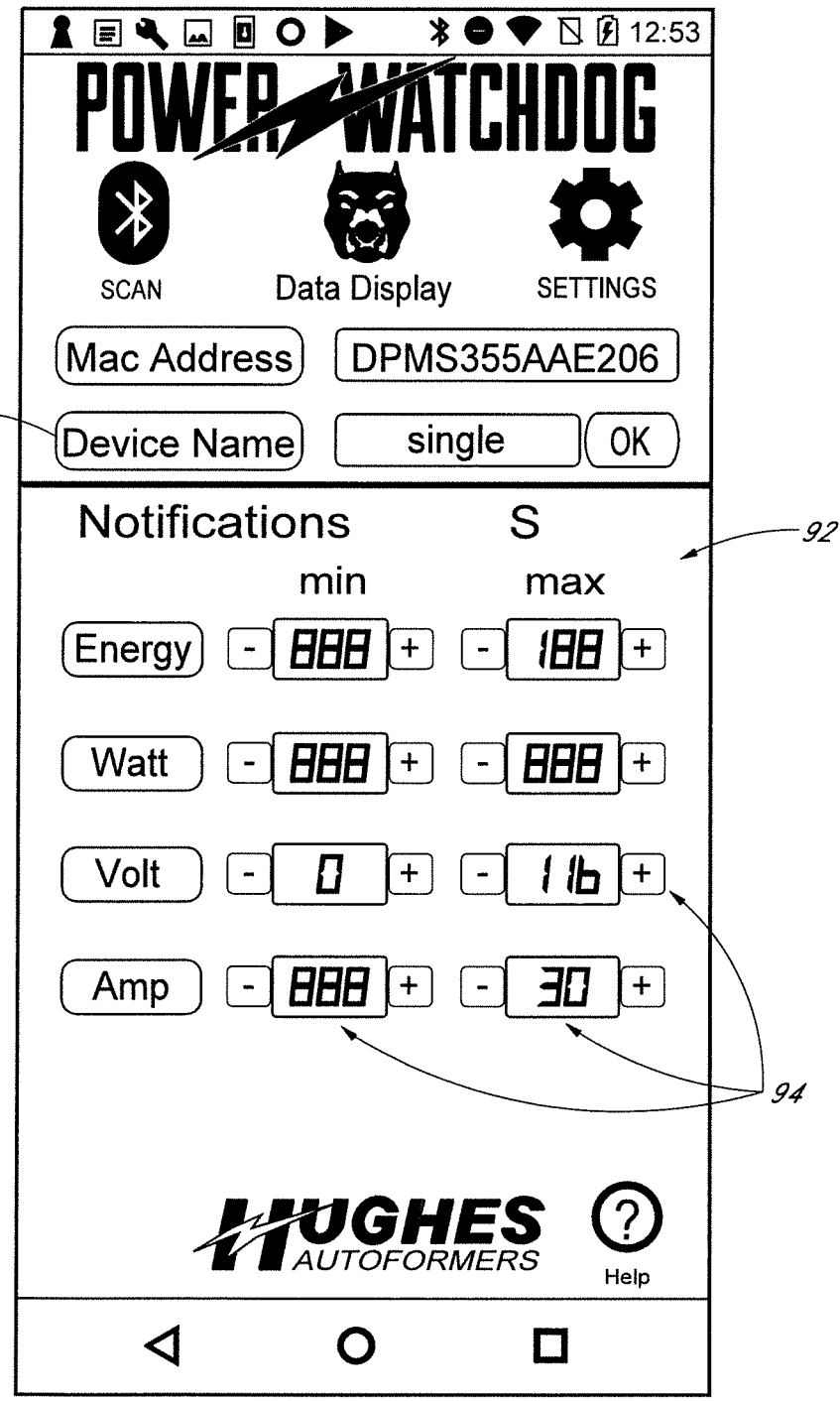
FIG. 7 shows another screen of an app for use with a remote device in communication with the power conditioner device.

With reference next to FIG. 5, another embodiment of a power monitoring device 20 has a different configuration for the display 70. For example, an LCD display controlled by the power monitoring module 60 displays codes indicating the current power conditions. An indicator LED (preferably red) is configured to alight if the power monitoring module 60 detects a power supply problem. For example, in the illustrated embodiment, the indicator LED glows red when the park power is missing a neutral.

Additionally, in the illustrated embodiment, a plurality of LEDs are configured to alight the graphic 80, which preferably is configured as a lens that glows when the associated LEDs are actuated. When power is connected and operating properly, the power monitoring module 60 preferably controls the LEDs to glow white. Thus, a white glow indicates properly-operating park supply power. This is particularly effective at night, as the white glow is configured to light up the park power panel and surrounding area, providing users with a quick and easy way to check power status remotely, and also providing a night light to discourage prowlers or thieves. When the power monitoring module 60 determines that there is a power problem, the module may control the LEDs to glow a different color, such as red. This, again, provides an easily-visible indicator to the user, prompting the user to take a closer look at the power performance.

With reference again to FIG. 3, preferably the power monitoring device 20 includes a wireless communication module 80. Such a wireless communication module 80 can include electronic structure for processing, transmitting and receiving wireless signals, and may include or interface with an antenna structure (which may comprise one or more antennae) that can be mounted within or as part of the housing 22 and/or within or in conjunction with one or more of the input and output wires 24, 28. Preferably at least the power monitoring module 60—and in some embodiments the power conditioning module 50—communicates with the wireless communication module 80 so that electrical parameters can be wirelessly communicated to a remote device 90, such as a computing device including a tablet, smartphone, the cloud, etc. In the illustrated embodiment, the wireless communication module 80 is mounted on and supported by the power monitoring module 60. In additional embodiments the wireless communication module 80 can be mounted within the housing 22 having its own printed circuit board separate from the other modules.

In the illustrated embodiment, the wireless communication module 80 comprises a Bluetooth communications structure. Software such as an "app" is loaded onto the remote computing device 90 that is equipped to receive Bluetooth communications, and thus the power monitoring device 20 is able to communicate electrical performance data to the remote device 90 via the wireless communication module 80. In the illustrated embodiment, the remote device 90 comprises a smartphone, and the app enables electronic parameters to be displayed on the smartphone screen 92. In some embodiments, the same display features that are provided on the display 70 of the power monitoring device housing 22 can also be communicated to and displayed by the remote device 90.

Figure 8:
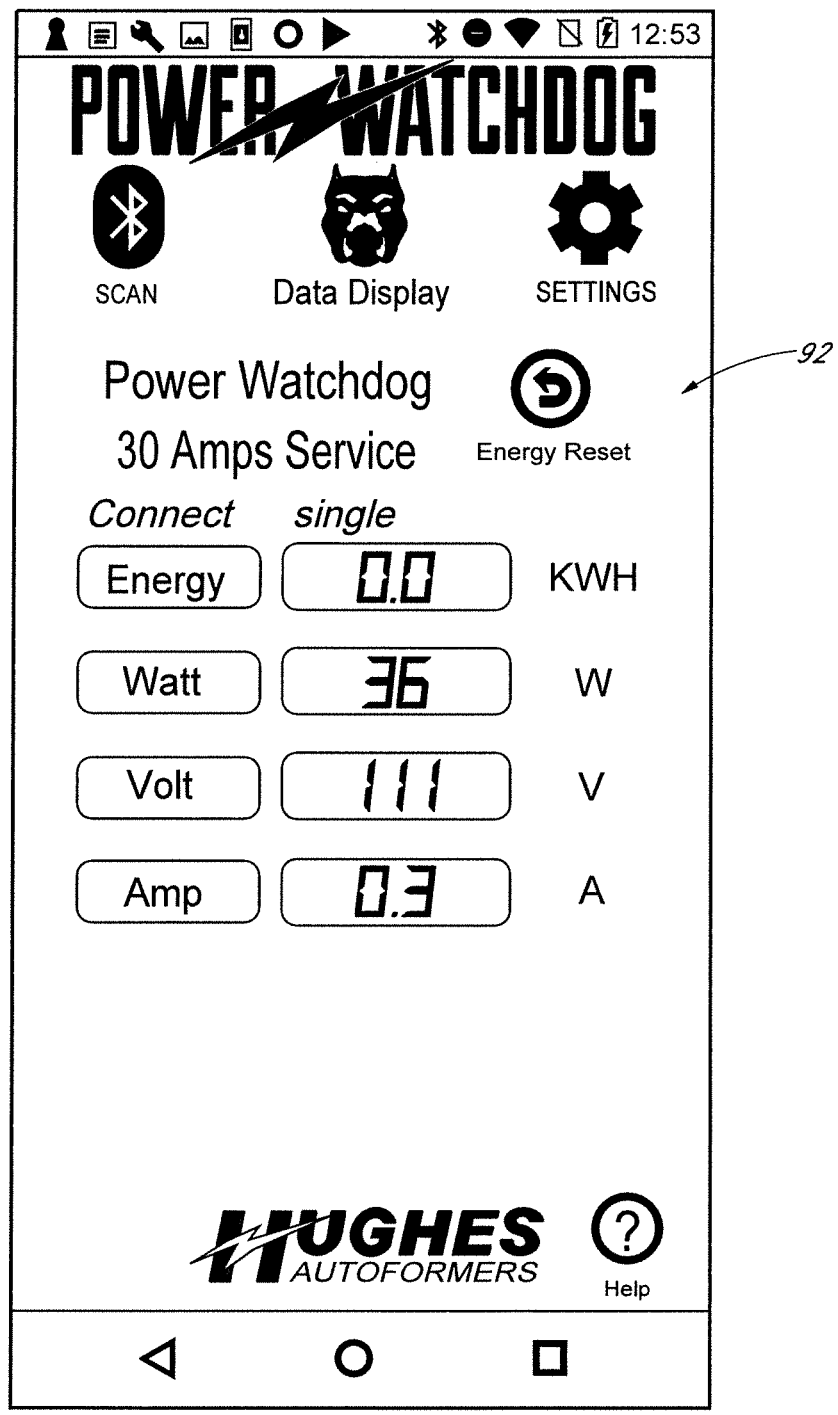
FIG. 8 shows yet another screen of an app for use with a remote device in communication with the power conditioner device.

Preferably the remote device 90 can be conventionally paired with the power monitoring device 20 via Bluetooth. With additional reference to FIGS. 6-9, the app enables selective pairing to one or more power monitoring devices 20, and enables the user to assign a unique name 91 to each paired device. Once set up, the power monitoring device 20 will transmit data to the remote device 90, enabling the user to view and monitor power parameters. Such data can be transmitted automatically in real time or periodically, or upon request from the remote device 90, as desired. In the illustrated embodiments (see FIG. 8-9) power parameters such as the voltage and current in each line, watts supplied, and overall energy supplied are displayed. It is to be understood that more or less power information can be supplied as desired. Also, in some embodiments the app will enable access to historical data, and can even calculate and display comparisons of current, real time power use data with historical power use data.

As noted above, RV park power supplies 33 are marked by inconsistency and low quality. Such low-quality power supplies can have a negative effect on aspects of the RV 40 electrical system. Accordingly, in a preferred embodiment, not only does the power monitoring device 20 enable real time monitoring of power performance data, but it may also provide notifications to the user's remote device 90 when aspects of the RV park power supply 33 fall out of acceptable ranges. As such, the user can be alerted to address power supply problems before damage is done to the RV's 40 electrical system.

With particular reference again to FIG. 7, preferably the user has the ability to set ranges of acceptable parameters for particular power aspects. In the illustrated embodiment, the app provides input boxes 94 for the user to set acceptable minimum and maximum threshold values of power aspects such as total energy used in a period, energy flow in watts, sensed voltage and sensed current. Notably, in the illustrated embodiment, if the user does not create a MIN or MAX setting for a particular power supply aspect, the device and/or app will not make any determination about whether that particular aspect falls out of any range. Not all boxes 94 provided need be used. Similarly, the user can provide data for both the acceptable MIN and MAX, only the MIN or only the MAX, as desired. Additionally, in some embodiments the app will have certain default values that will be used as the threshold MIN and MAX unless and until changed by the user.

If the sensed supply power aspect falls out of the set ranges, a notification will be sent to the user. Such a notification can take various forms, such as an aural or vibrating alarm via the smartphone's 90 inherent notification programming, and may also come in other forms, such as an email or text message. The user will then be apprised of the power supply problem and may take corrective action as appropriate.

Figure 9:
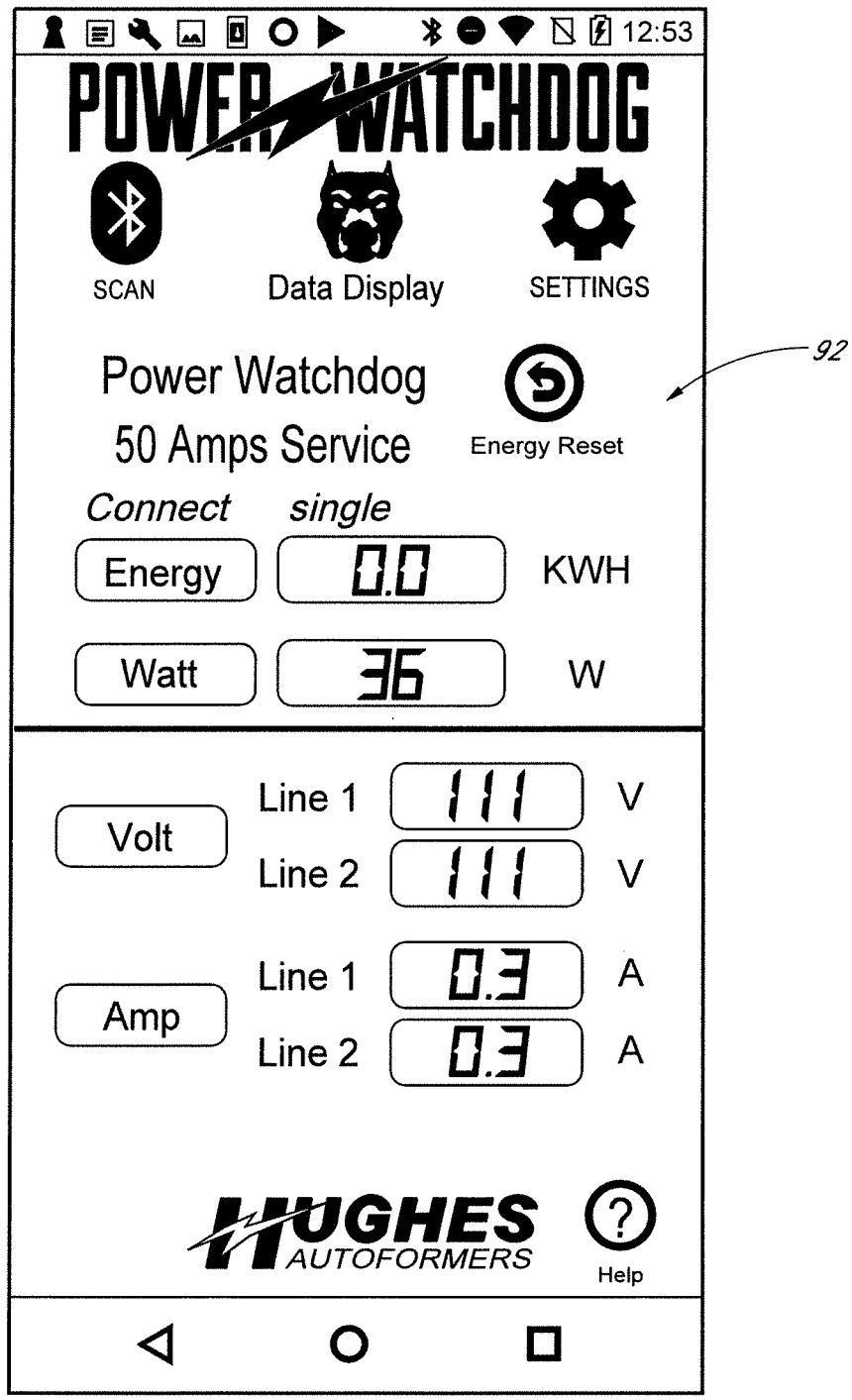
FIG. 9 shows still another screen of an app for use with a remote device in communication with the power conditioner device.

The user may use the remote device to monitor power in real time. For example, 50 amp arrangements typically employ two power 90 delivery lines into the RV 40. As depicted in FIG. 9, the electric power characteristics of both lines are monitored. However, appliances that may be used in an RV 40 may draw vastly different loads, and it is preferred to keep the power delivery lines generally equivalent. Thus, a user may use the remote device to arrange the electrical load of appliances or other devices in the RV 40 in a manner that maintains load balance between the power delivery lines.

It is to be understood that additional aspects and power performance issues can be monitored. For example, in some embodiments, a power conditioner device 20 may be configured to automatically cut off power supply to the RV 40 if it is determined that the RV park supply power 33 is of such low quality that damage to the RV's electrical system is imminent. In such an embodiment, a notification may be sent upon cut off of the power supply in order to inform the owner—who may be remote from the RV 40—that power has been cut off. The notification will include data concerning the power status, showing the reasons why the power was cut off. It is also to be understood that the app can be configured to allow the user to select and set the criteria for cutting off the power supply. For example, the user can enter a MIN voltage setting of 102V and a MAX of 132V, and the power monitoring device will then shut off power if the detected voltage falls below the MIN or above the MAX, and will then notify the user that power was shut off, and why. In still further embodiments, notifications can be generated for maintenance issues. For example, if the power monitoring device 20 determines that the surge protector module 50 is nearly worn out, a notification can be generated to alert the user of the need to replace the surge protector module 50.

In additional embodiments, the wireless communications module 80 can be configured to extend range from typical Bluetooth communications ranges. For example, additional structure, such as a Bluetooth router (see the Cassia Hub Bluetooth Router available from Cassia Networks) can be employed to extend wireless range. In additional embodiments, the wireless communications module can include WiFi connection capability enabling the power monitor device to connect to RV Park WiFi, a WiFi hub of the RV, or the like.

Figure 10:
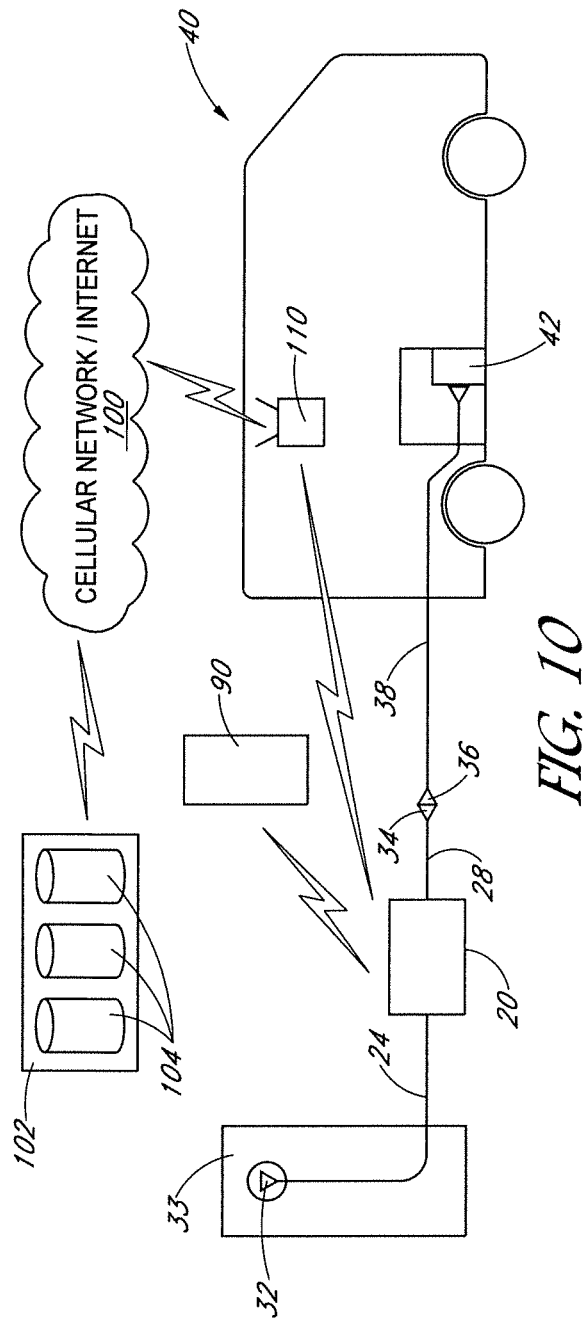
FIG. 10 is a schematic view of another embodiment of a setup employing a power conditioner device.

With additional reference to FIG. 10, in still other embodiments the wireless communications module 80 can include communications structure enabling it to connect to a cellular network 100 or, in still further embodiments, a satellite-based communications network and/or the internet. In some embodiments, communications media such as a cellular data card or embedded cellular gateway can be provided with the housing 22 and configured to enable the power monitor device 20 to connect to a cellular network which, in some embodiments, may connect the power monitoring device 20 with the internet. Further equipment, such as cellular signal boosters, can also be provided within the housing 22 in some embodiments, or as separate structures in other embodiments that can be plugged in or otherwise interfaced with the housing. As such, in some embodiments the power monitoring device 20 may communicate with the remote device 90 via a cellular network 100 and/or the internet, and such communications between the power monitoring device 20 and the remote device 90 may be independent of Bluetooth—or other near-field communications—range.

In such embodiments, the power monitor device may or may not be used in connection with an app installed on the user's smartphone 90. For example, rather than monitoring power using a screen 92 of an app, notifications when power supply aspects fall outside acceptable ranges can be provided via text messages over the cellular network, or via email notifications from communications through the internet. The user may, in some embodiments, use his remote device 90 to access a web-based service that displays detailed monitoring data for his linked power monitor device 20. The web-based service may maintain a computer system 102 having one or more databases 104 that can store data and analysis generated by the power monitoring device, and can perform calculations of its own.

As noted above, power supply data can be stored in memory of the device 90. Data storage and processing can also be performed on the remote computing device. In embodiments in which the device 20 can communicate with the internet, power supply data can be uploaded to the cloud or a host network, where such data can be stored remotely from both the power monitoring device 20 and the linked remote device 90.

It is also to be understood that sensed power data can be combined or linked with other data. For example, in some embodiments, the power monitoring device 20 can included GPS location capability, and location data can be linked to the sensed power data. In other embodiments, the GPS capability of the user's smartphone 90 is referenced and recorded when the power monitoring device 20 is plugged into the RV park power supply 33. Power data obtained and stored during the time the device is plugged into that particular power supply 33 is linked to the location data. Such data can be stored on the smartphone 90, on one or more databases 104 of a remote computer network 102, or on the power monitoring module 60. The GPS location can be correlated to the location of the particular RV park. As such, a record or memory is kept of the power supply quality of parks that the user has visited. Such data can also be tied to the detected date(s) of use. In some embodiments, such data can be combined with data obtained from multiple users that subscribe to the same web-based service to create a cloud-based database cataloging users' actual experience with the power supply of particular RV parks.

Figure 11:
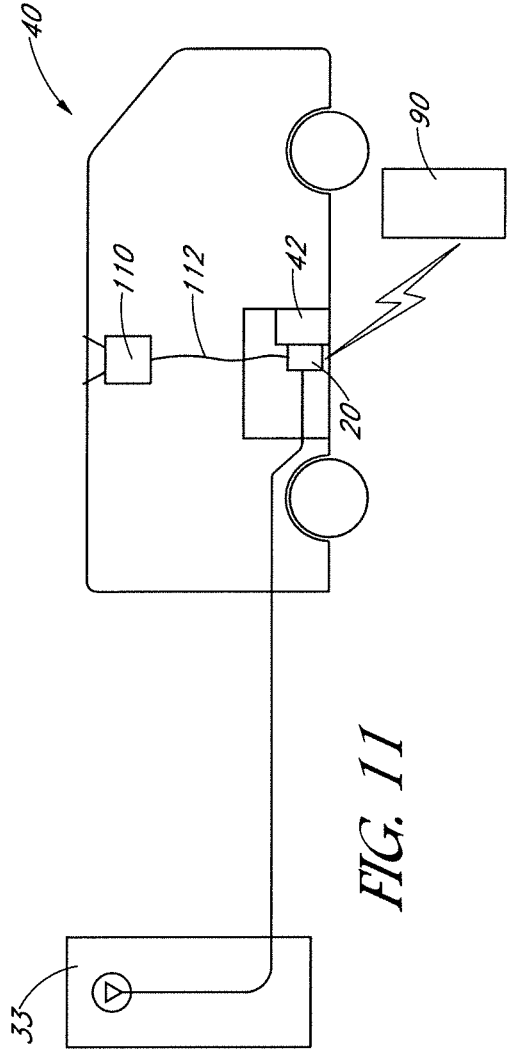
FIG. 11 is a schematic view of yet another embodiment of a setup employing a power conditioner device.

With additional reference to FIG. 11, in some embodiments the power monitoring device 20 can be hard-wired to the switch box 42 of the RV 40. The power monitoring device 20 can still, however, employ wireless communication with the remote device 90. In another embodiment, the RV may have its own dedicated wireless communication system 110, such as a Verizon® JetPack®. The power monitoring device 20 can be configured to communicate wirelessly with the RV's dedicated system 110 or, in additional embodiments, can communicate with the dedicated system via a wire 112. In some embodiments, the power monitoring system 20 will communicate with the remote device 90 only through the dedicated system 110. With reference again to FIG. 10, it is contemplated that a line-mounted power monitoring device 20 can also communicate with an RV's dedicated wireless communication system 110.

The embodiments discussed above have disclosed structures with substantial specificity. This has provided a good context for disclosing and discussing inventive subject matter. However, it is to be understood that other embodiments may employ different specific structural shapes and interactions. For example, in additional embodiments, power conditioners such as autoformers can include power monitoring and wireless communication aspects as discussed herein, and can also include modular, replaceable surge protectors and other power conditioning structures as appropriate and desired. Still further aspects of electrical data may be reported in such embodiments. For example, the autoformer may be prompted to send a notification when the autoformer has been tripped by low-quality input power and is providing modified (but acceptable) power to the RV 40.

For example, during operation, an autoformer switches between a bypass configuration, which bypasses the transformer of the autoformer, and a tripped configuration, in which the park power is directed through the transformer to raise the voltage supplied to the RV 40. The wireless communication module 80 may thus notify the user when the autoformer switches between configurations, and may provide the autoformer status. Further, the power monitoring module 60 may communicate with a control circuit of the autoformer to learn the measured park input power, and provide such data to the user.

In still other embodiments, the app running on the remote device 90 may also be configured to be paired with at least some equipment of the RV's 40 electrical system, such as through the RV's dedicated wireless communication system 110. Such equipment may include their own wireless communication structure or communicate through the RV's 40 dedicated wireless communication system 110. For example, if the park power supply 33 is cut off, the user will receive a notification of such, as discussed above. The user can then navigate to a page of the app that displays equipment of the RV 40 electrical system that is wirelessly connected, such as the on-board generator and/or battery. The user can then gauge the charge level of the battery to determine whether the battery can, for example, provide sufficient power to keep the A/C or refrigerator operating. If not, the user can signal the generator to begin operation to charge the battery and ensure smooth operation of the RV 40 even though the park power supply 33 has failed, and even though the user may be remote from the RV 40.

Still further, the power monitoring device 20 can be configured to continue to monitor park power even after cutting off supply power due to power supply problems triggering such a cutoff. In some embodiments, if the park power returns to operating within set limits for a predetermined threshold period of time, the power monitoring device 20 can automatically restore power supply. In additional embodiments, the remote device 90 can have a setting allowing or disallowing such action by the power monitoring device 20, or providing guidance, such as to allow power delivery to be restored, but if the park supply power 33 goes out of compliance within a threshold period of time so that power is cutoff again, the power monitoring device 20 will not again attempt to restore power until specifically instructed to by the user via the app.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above.

I claim:

1. A recreational vehicle power monitoring device, comprising:
   a housing;
   a power input connection;
   a power output connection;
   a power conditioner module;
   a power monitoring module; and
   a wireless communication module;

wherein said power conditioner module and power monitoring module are substantially contained within said housing;
wherein said power conditioner module comprises a surge protector;
wherein said power monitoring module comprises one or more power monitoring sensors;
wherein said power conditioner module is removeable, replaceable, and independent of said power monitoring module;
wherein said wireless communication module is configured to generate and transmit a plurality of information that is gathered by said one or more power monitoring sensors;
wherein said one or more power monitoring sensors are configured to determine a condition of said surge protector;
and wherein said wireless communication module sends a notification to a user if said surge protector needs to be replaced.

2. The recreational vehicle power monitoring device of claim 1, wherein said power input connection is configured to receive power from a recreational vehicle park power source; and
wherein said power output connection is configured to send power to a recreational vehicle.

* * * * *